United States Patent
Cole et al.

(10) Patent No.: US 7,310,865 B2
(45) Date of Patent: Dec. 25, 2007

(54) GAP SETTING TOOL AND METHOD OF OPERATING SAME

(75) Inventors: James A. Cole, Sterling Heights, MI (US); Brian K. Davis, Romeo, MI (US)

(73) Assignee: General Motors Corporation, Detroit, MI (US)

( * ) Notice: Subject to any disclaimer, the term of this patent is extended or adjusted under 35 U.S.C. 154(b) by 486 days.

(21) Appl. No.: 10/780,382

(22) Filed: Feb. 17, 2004

(65) Prior Publication Data

US 2005/0177991 A1   Aug. 18, 2005

(51) Int. Cl.
*B25B 27/14* (2006.01)
*B23Q 3/00* (2006.01)
*B21D 53/88* (2006.01)

(52) U.S. Cl. .......................... 29/281.5; 29/464; 29/467; 29/468; 29/897.2; 29/271; 269/21

(58) Field of Classification Search ................ 29/467, 29/464, 281.5, 897.2, 712, 468, 283, 281.1, 29/281.4, 271; 33/600, 613, 645; 269/21
See application file for complete search history.

(56) References Cited

U.S. PATENT DOCUMENTS

| 4,811,936 | A  | * | 3/1989 | Laymaster ................... 269/43 |
| 5,406,697 | A  | * | 4/1995 | Busisi ......................... 29/721 |
| 6,418,603 | B1 | * | 7/2002 | Baluta ....................... 29/281.5 |
| 6,701,596 | B2 | * | 3/2004 | Kloepfer et al. ........... 29/281.5 |
| 6,708,393 | B1 | * | 3/2004 | Roy et al. .................... 29/714 |

* cited by examiner

*Primary Examiner*—David P. Bryant
*Assistant Examiner*—Christopher M Koehler

(57) ABSTRACT

A gap setting tool for setting a gap between a pair of panels includes a first body portion, a second body portion, and a pin having a predetermined diameter. The first body portion, the second body portion, and the pin are movable relative to one another. One of the panels is fixed and the other panel is movably mounted adjacent thereto. The body portions are operable to be attached to respective ones of the pair of panels, such as by vacuum cups or the like, and drawn toward one another with the pin in the gap until the panels contact the pin.

6 Claims, 5 Drawing Sheets

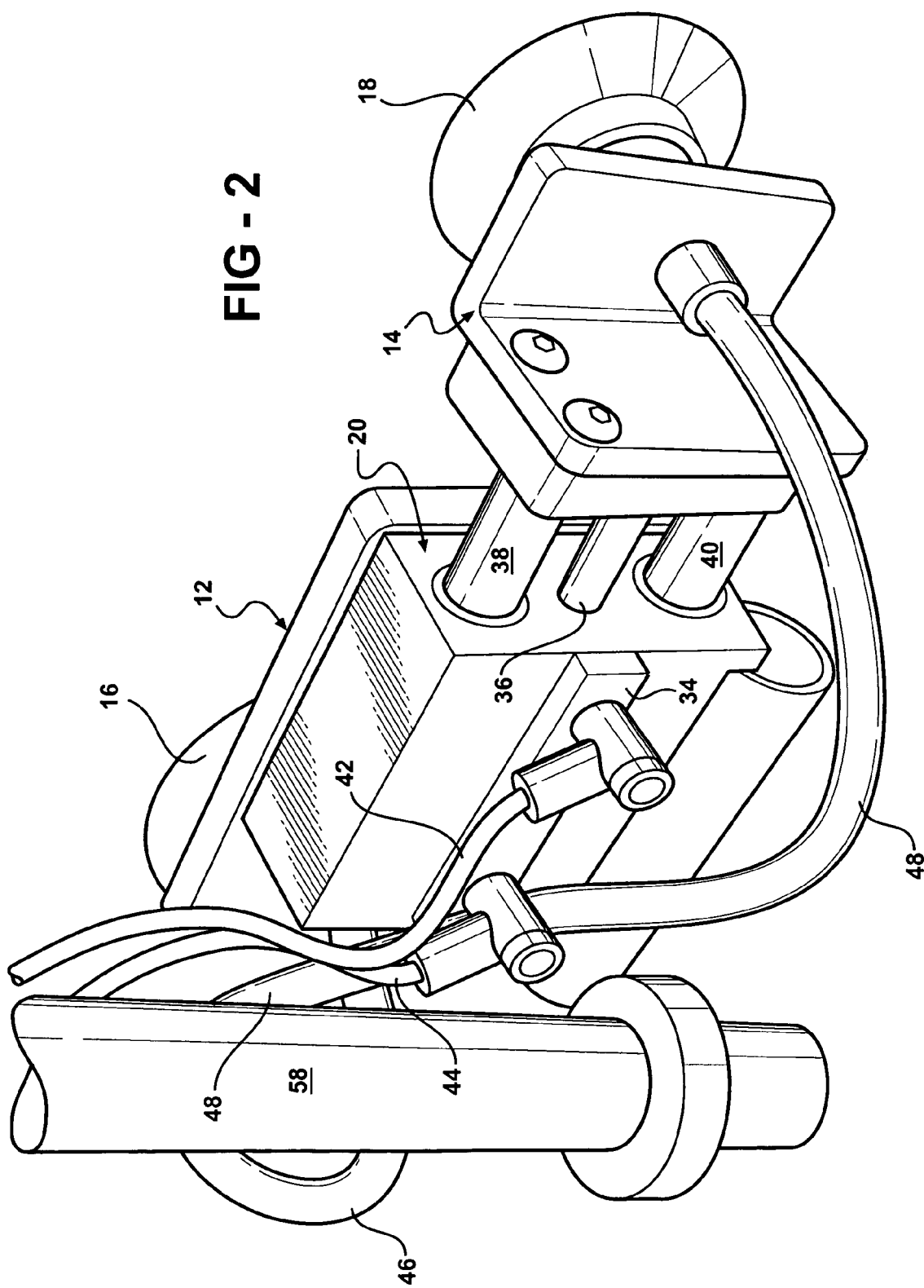

GAP SETTING TOOL AND METHOD OF OPERATING SAME

BACKGROUND OF THE INVENTION

The present invention relates generally to assembly tools and methods, in particular, to a tool for setting a gap between a pair of body panels, such as in an automotive assembly plant.

A gap is typically set between a pair of automotive body panels by fixing one of the panels, and then fixing the other of the panels while placing a tool between adjacent edges of the panels to set a gap therebetween. Prior art methods for gapping a pair of panels include the use of multiple human operators, wherein one operator gaps with a manual gap block and holds the loose panel while the other operator secures the loose panel. Another use of multiple operators includes an installer securing the loose panel as close as possible and finesse operators further down the assembly line subsequently adjusting any discrepant gaps.

Another more recent method of gapping a pair of panels is performed by a single operator who places a block or tool into the gap, uses a manually operated mechanism or a hip/knee to hold the panel in place, pushes the two panels together, and then secures the loose panel. The single operator methods, in particular, often experience failed results and cause problems in attempting to produce repeatable gaps within tolerances. Another problem compounding the issue of gapping panels is that there is no easy way to read gaps on panels with large radii.

It is desirable, therefore, to provide an apparatus and a method for setting a gap between a pair of panels to improve fits and to eliminate operator variation from the gap setting process.

SUMMARY OF THE INVENTION

A gap setting tool for setting a gap between a pair of panels in accordance with the present invention includes a first body portion, a second body portion and a pin having a predetermined diameter, the first body portion, the second body portion and the pin being movable relative to one another. The first and second body portions are operable to be releasably attached to the pair of panels, first and second panels respectively, by vacuum cups or the like. Preferably, the first and second body portions are movably attached to one another by an actuator. The motion of the actuator and the activation of the vacuum cups is controlled by a control panel or the like.

The gap setting tool is preferably operated in a method having the steps of providing the gap setting tool having the first body portion, the second body portion and the pin having the predetermined diameter, the first body portion, the second body portion and the pin being movable relative to one another; inserting the pin into a gap between a fixedly mounted first panel and a movably mounted second panel; attaching the first body portion to the first panel and attaching the second body portion to the second panel; moving the second body portion relative to the first body portion until the first and second panels contact the pin; and fixedly mounting the second panel spaced from the first panel by the predetermined diameter.

The tool in accordance with the present invention advantageously allows a single line worker to loosely install a panel to a vehicle adjacent a fixed panel, to insert the gap setting tool into a predefined gap area between the panels, to activate the tool (automatically or manually) to releasably retain the tool on the panels and draw the panels together, to secure the loose panel to the vehicle to retain the preset gap, and remove the tool and proceed to the next vehicle.

The gap setting tool may be advantageously modified to work with a single side vacuum cup paired with a mechanical feature such as a locating pin, a nylon nesting block, or other feature in order to work in a variety of applications and with a variety of surface shapes. The gap setting tool can be used in different size applications ranging from small or large gaps and with body panels having materials of different hardness including, but not limited to, steel, plastic, or the like.

The gap setting tool also provides increased efficiency by allowing the manufacturing plant to use a single operator to set the gaps between the panels and secure the panels with fasteners. The gap setting tool also provides increased quality by removing operator variability and measurement error from the process, providing for a more repeatable system.

The gap setting tool in accordance with the present invention combines technology with process to improve fits compared to other prior art methods. The gap setting tool may be advantageously utilized on panels with large radii. Furthermore, the gap setting tool may be used advantageously on painted metal panels or on plastic panels, which tend to bow or distort when using prior art gap setting tools.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a perspective view of an actuator of the tool of FIGS. 1a and 1b;

DESCRIPTION OF THE PREFERRED EMBODIMENT

Figure 1A:
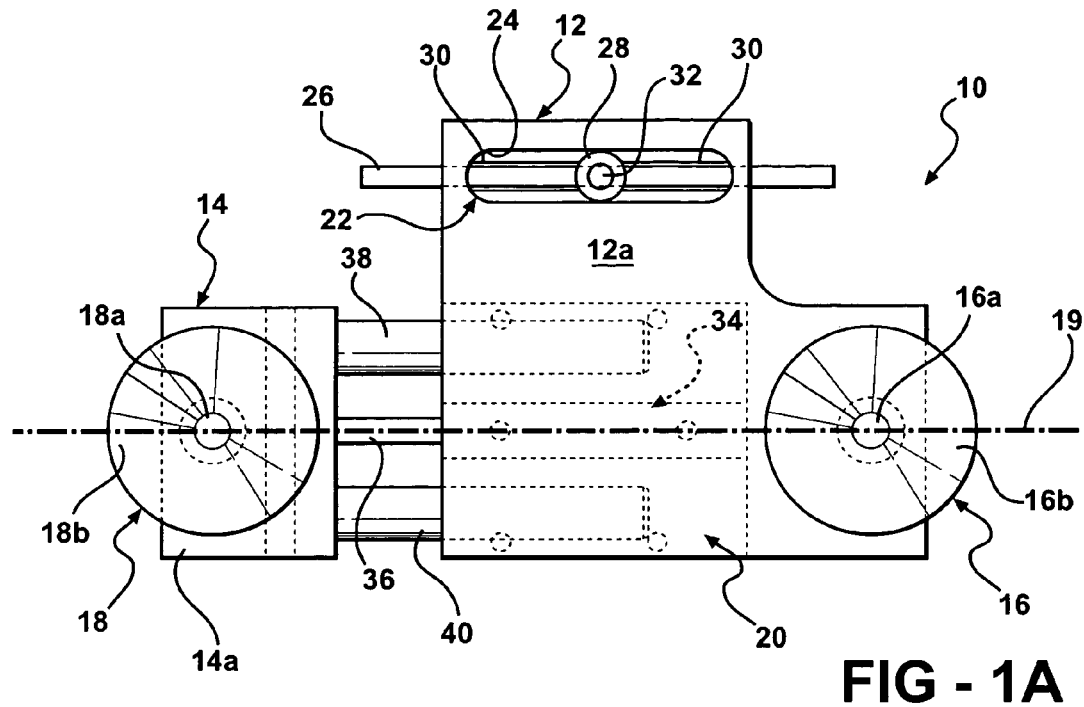
FIG. 1a is a schematic view of a tool in accordance with the present invention shown in an extended position.
Figure 1B:
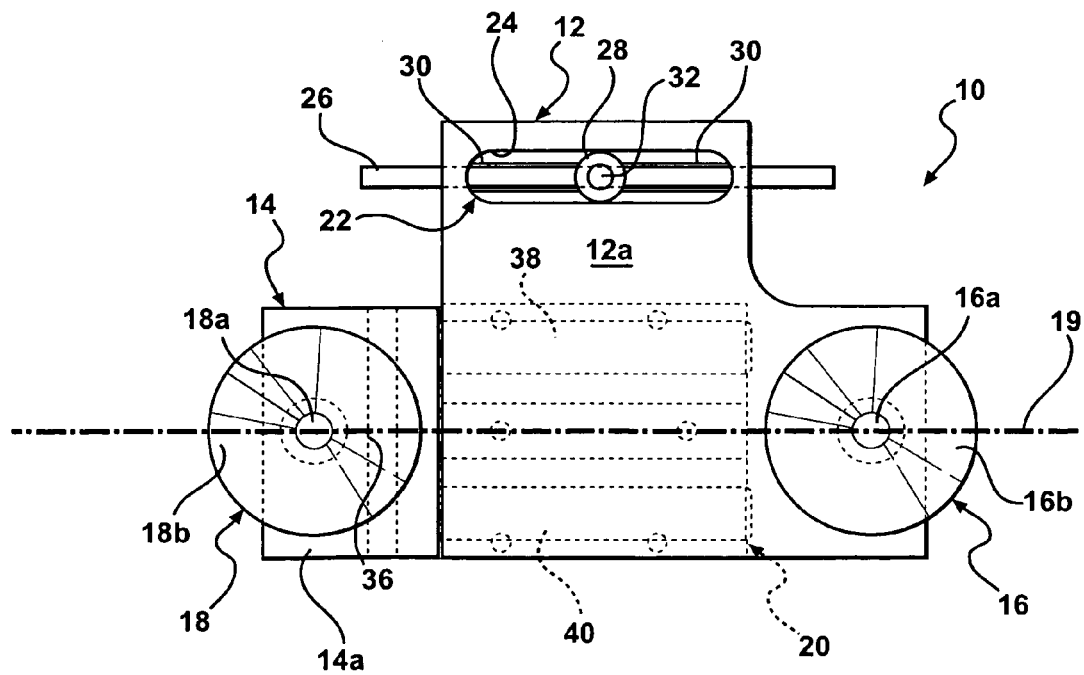
FIG. 1b is a schematic view of the tool of FIG. 1a shown in a retracted position.

Referring now to FIGS. 1a and 1b, a schematic view of a gap setting tool in accordance with the present invention is indicated generally at 10. The tool 10 includes a first body portion 12 and a second body portion 14. The body portions 12 and 14 are spaced apart and connected by an actuator, indicated generally at 20 and discussed in more detail below. The actuator 20 is operable to move the body portions 12 and 14 relative to one another between an extended position, shown in FIG. 1a and a retracted position, shown in FIG. 1b. The first body portion 12 includes a first vacuum cup 16 attached thereto and the second body portion 14 includes a second vacuum cup 18 attached thereto. Preferably, the vacuum cups 16 and 18 are located along an axis of movement 19 of the body portions 12 and 14. The vacuum cups 16 and 18 respectively extend outwardly in a direction substantially perpendicular to an interior surface 12a of the first body portion 12 and an interior surface 14a of the second body portion 14. The vacuum cups 16 and 18 are each adapted to be releasably attached to a body panel, best seen in FIGS. 3 and 4 and discussed in more detail below, and are connected to a vacuum source, best seen in FIG. 5.

The first body portion 12 is generally L-shaped with the vacuum cup 16 mounted at a free end of a foot portion. An elongated aperture 22 is formed in a free end of a leg portion of the first body portion 12 disposed away from the suction cup 16 and is defined by an inner surface 24 thereof. A guide rod 26 extends across the length of the aperture 22 and extends beyond opposed sides of the leg portion of the first body portion 12. The guide rod 26 is slidably received in a substantially center portion of the aperture 22 by a drum 28. A pair of springs 30 on opposing sides of the drum 28 is slidably disposed on an outer surface of the guide rod 26 and extend between a respective outer surface of the drum 28 and the inner surface 24. Preferably, the springs 30 have substantially the same length and spring constant in order to center the drum 28 in the aperture 22 and to ensure a consistent, self-centering location for the drum 28. Either of the springs 30 will compress and urge the drum 28 towards the center of the aperture 22 when the drum 28 is deflected or displaced. A pin 32 having a predetermined diameter and length is releasably received in an open end of the drum 28 and extends outwardly for a predetermined distance from the free end of the drum 28 in a direction substantially perpendicular to the interior surface 12a. The pin 32 may be replaced by another interchangeable pin or pins (not shown) having differing lengths and/or diameters. Preferably, the pin 32 is constructed of a turned nylon material or a similar material to provide a precise diameter dimension and prevent damage when in contact with the body panels.

Referring now to FIG. 2, the actuator 20 is shown in more detail. The actuator 20 is preferably a pneumatic actuator connected to a compressed air supply, best seen in FIG. 5, and includes a power cylinder 34 having a power rod 36 extending therefrom. The power cylinder 34 is operable to extend and retract the power rod 36, discussed in more detail below. The power rod 36 is disposed between an upper guide rod 38 and a lower guide rod 40, each of which are received in opposing apertures (not shown) in each of the body portions 12 and 14. Preferably, one end of each of the guide rods 38 and 40 is fixedly received in the second body portion 14 and the other end of each of the guide rods 38 and 40 is slidably received in the first body portion 12. The guide rods 38 and 40 provide stability to the tool 10 when the body portions 12 and 14 are moved relative to one another by the power cylinder 34. The power cylinder 34 includes a first air supply line 42 and a second air supply line 44 attached on opposed ends thereof. The air supply lines 42 and 44 supply compressed air to opposing sides of a power piston (not shown) slidably disposed in the power cylinder 34. The vacuum cups 16 and 18 are connected to the vacuum source by a respective vacuum line 46 and 48. The vacuum line 46 is in fluid communication with an aperture 16a formed in the vacuum cup 16 (best seen in FIGS. 1a and 1b) and the vacuum line 48 is in fluid communication with an aperture 18a formed in the vacuum cup 18 (best seen in FIGS. 1a and 1b).

Figure 3:
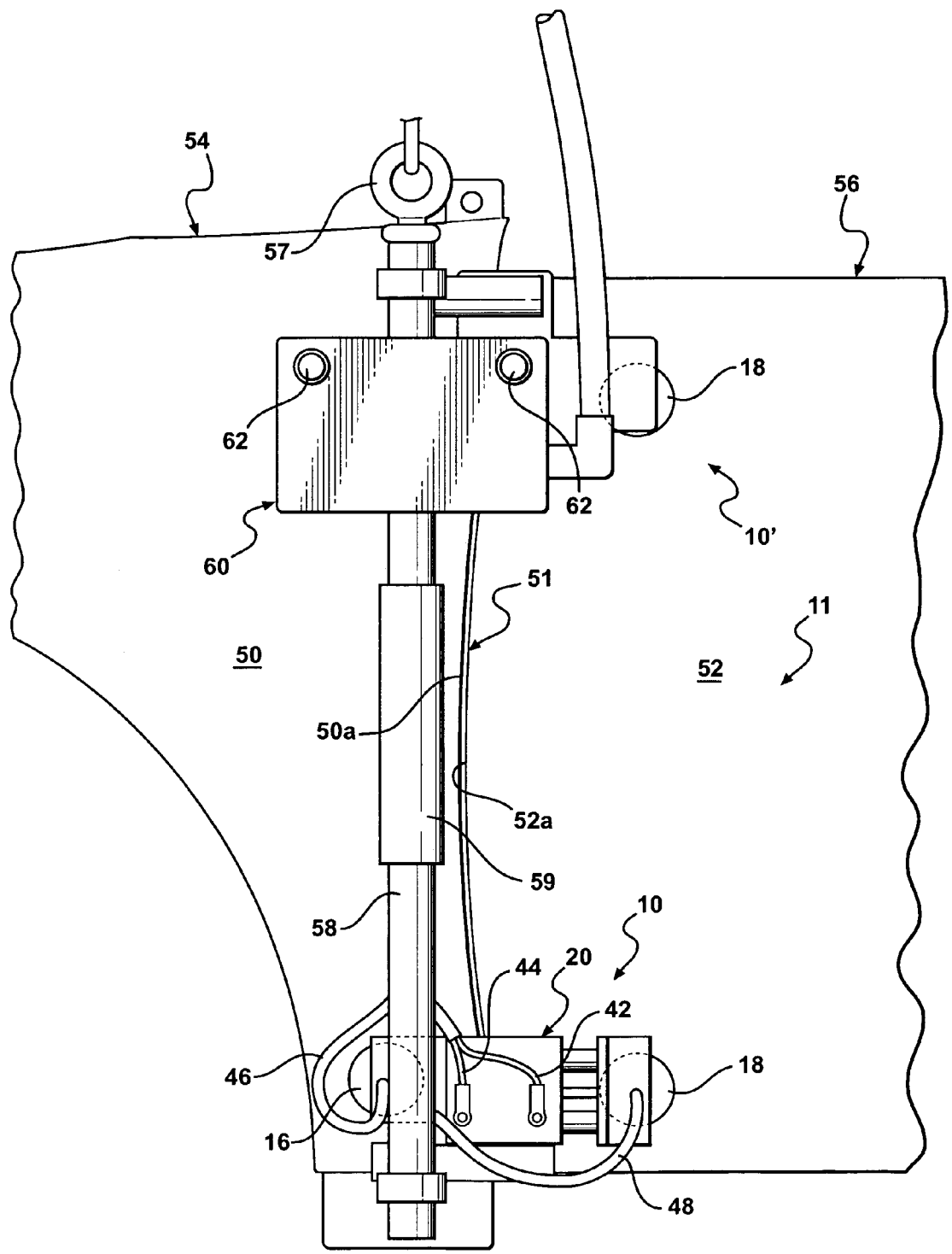
FIG. 3 is a elevation view of a pair of the tools in accordance with the present invention shown attached to a pair of body panels.
Figure 4:
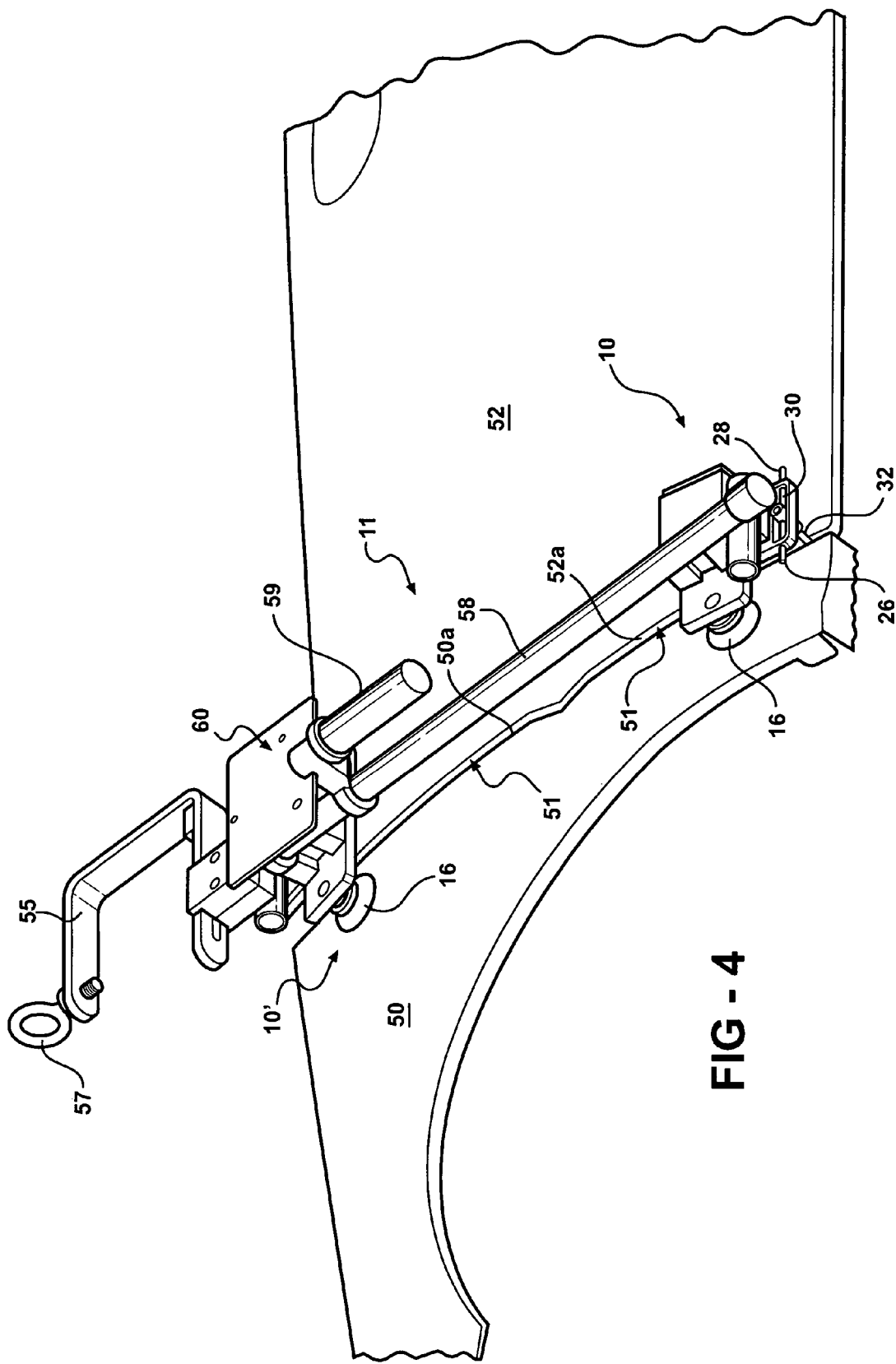
FIG. 4 is a perspective view the tools shown in FIG. 3 with a support bracket and the pair of body panels.
Figure 5:
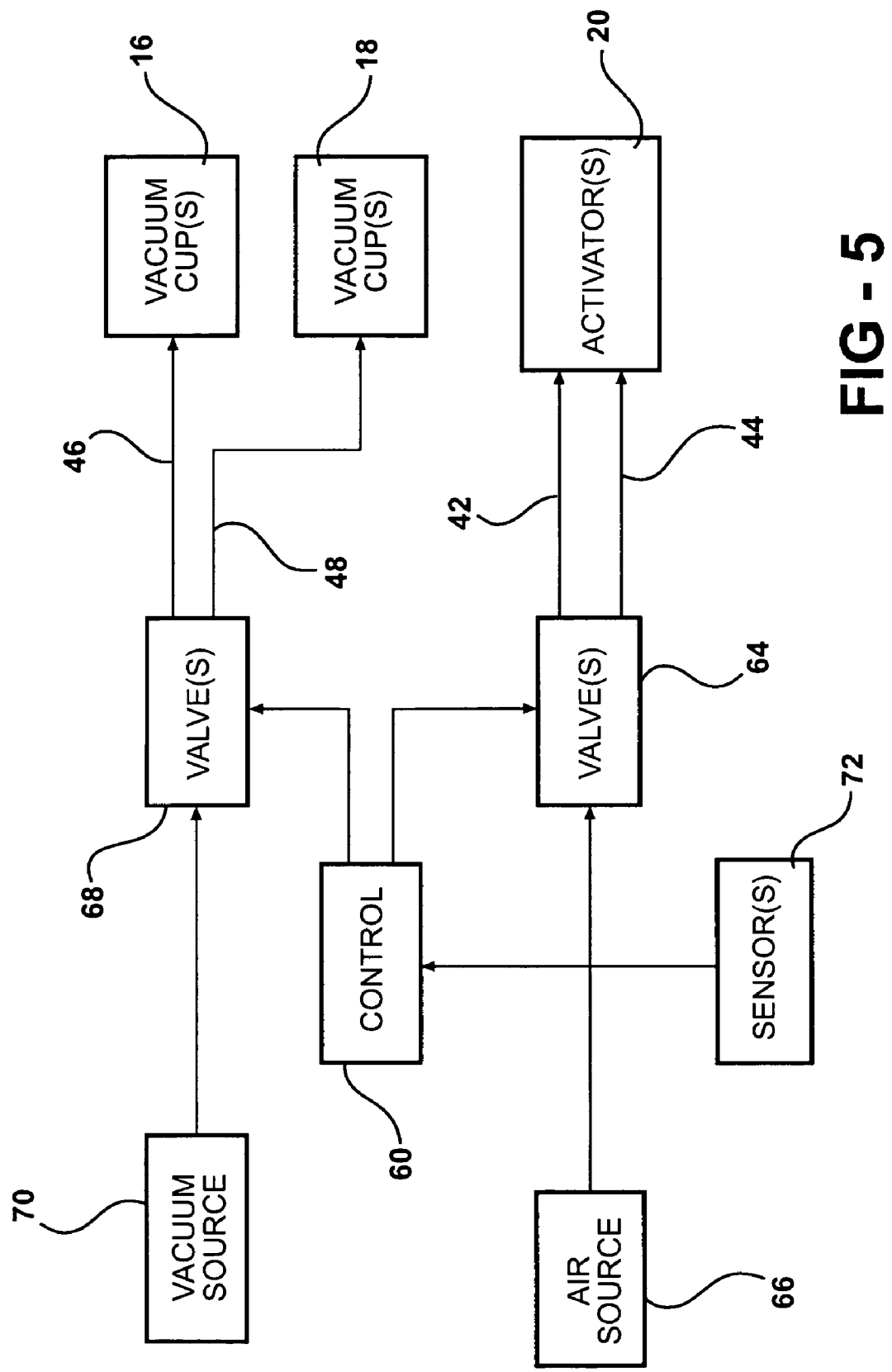
FIG. 5 is a block diagram view of a tool in accordance with the present invention including a vacuum source and an air source.

Referring now to FIGS. 3-5, the tool 10 and a tool 10' are shown adjacent a first panel 50 and a second panel 52. The tool 10' is identical to and includes the same elements as the tool 10. The body panels 50 and 52 define a gap 51 between an edge 50a of the first body panel 50 and an edge 52a of the second body panel 52. Preferably, the first panel 50 and the second panel 52 are exterior automotive body panels. Alternatively, the panels 50 and 52 are any type of panels that require a gap, such as the gap 51, therebetween. The first panel 50 and the second panel 52 are adapted to be attached to a respective mounting location, indicated generally at 54 and 56, such as a vehicle body frame or the like. The tools 10 and 10' are attached by an elongated connector member 58 to form a tool assembly 11. A handle 59 extends outwardly from the connector member 58 intermediate the tools 10 and 10' for easier manipulation of the assembly 11 by an operator (not shown). An eyebolt 57, best seen in FIG. 3 extends from an upper portion of the connector member 58 for suspending the assembly 11 therefrom to further provide for easier manipulation for the operator to move the assembly 11 within an assembly plant, for example. Alternatively, a bracket 55 having the eyebolt 57 extending upwardly therefrom, best seen in FIG. 4, extends from the upper portion of the connector member 58.

A controller or control panel 60 is mounted on the connector member 58 and controls the operation of the tools 10 and 10', in particular the operation of the vacuum cups 16 and 18 and the actuator 20. The control panel 60 includes control buttons 62 thereon for selectively actuating the actuators 20 and the vacuum cups 16 and 18. Preferably, the actuators 20 are controlled by selectively connecting and disconnecting a valve or valves 64 from an air source 66 (best seen in FIG. 5) to the supply lines 42 and 44, which alternately supplies and exhausts compressed air to the opposing sides of the power piston to move the first body portion 12 and the second body portion 14 relative to one another along the axis 19. Preferably, the vacuum cups 16 and 18 are controlled by selectively connecting and disconnecting a valve or valves 68 from a vacuum source 70 (best seen in FIG. 5) to the vacuum lines 46 and 48. Preferably, the vacuum source 70 is controlled by the air source 66, such as by powering compressed-air powered vacuum pumps or the like.

The pin 32 is preferably constructed of a turned nylon material or a similar material that is soft enough to not damage the edges of the body panels 50 and 52 when placed in the gap 51, discussed in more detail below. A respective interior surface 16b and 18b of each of the vacuum cups 16 and 18, best seen in FIGS. 1a and 1b, is operable to attach firmly yet releasably to the respective edges 50a and 52a of the panels 50 and 52, during operation of the tool 10 or 10'.

In operation, the tools 10 and 10' are operable to set the gap 51 between the panels 50 and 52. One of the panels 50 or 52 is fixedly attached to the respective mounting location 54 or 56, and the other of the panels 50 or 52 is loosely attached to the respective mounting location 54 or 56, defining the gap 51 between the panels 50 and 52. The tools 10 and 10' are placed adjacent the panels 50 and 52 with the pins 32 extending into the gap 51, best seen in FIG. 4, and the interior surfaces 16b and 18b of the vacuum cups 16 and 18 touching the exterior surfaces of the panels 50 and 52. Once the pins 32 and the vacuum cups 16 and 18 are in place, the vacuum cups 16 and 18 are activated, creating a vacuum at the apertures 16a and 18a and firmly attaching the interior surfaces 16b and 18b to the exterior surfaces of the panels 50 and 52. After the vacuum cups 16 and 18 are actuated, the actuators 20 are activated and the power pistons move the power rods 36 from the extended position to the retracted position thereby moving the second body portions 14 towards the first body portions 12 along the axis 19. The actuators 20 continue to move the second body portions 14 toward the first body portions 12 until the respective edges 50a and 52a of each of the panels 50 and 52 is touching the exterior surfaces of the pins 32. After the panels 50 and 52 have been drawn together, the loosely attached panel 50 or 52 is fixedly attached, after which the vacuum cups 16 and 18 and the actuators 20 are deactivated, and the tools 10 and 10' are removed from the panels 50 and 52 and the gap 51. The actuators 20 remain activated until the loosely attached panel 50 or 52 is fixedly attached in order to hold the panels 50 and 52 against the pins 32 at a constant pressure. After the tools 10 and 10' are removed, the power pistons of the actuators 20 move the second body portions 14 away from the first body portions 12 to complete an activation cycle and the activation cycle is ready to be repeated.

The control panel 60 may deactivate the vacuum cups 16 and 18 and automatically reset the actuators 20 after a predetermined time interval has elapsed. The predetermined time interval may be adjusted depending on the requirements of the tools 10 and 10'.

Preferably, the control panel 60 includes control logic, relays or a similar protection device or devices, such as a sensor or sensors 72 in FIG. 5, to prevent activation of the actuators 20 unless and until the vacuum cups 16 and 18 have been activated completely. The control panel 60 and/or the actuators 20 may include flow controls or similar protection devices such as the sensor or sensors 72 to adjust and/or restrict the speed at which the power piston moves the power rod 36 between the retracted and extended positions.

The control panel 60 may deactivate the vacuum cups 16 and 18 and automatically reset the actuators 20 after a predetermined time interval has elapsed. The predetermined time interval may be adjusted depending on the requirements of the tools 10 and 10'.

Alternatively, the vacuum cups 16 and 18 and the actuators 20 are electrically actuated (not shown) or hydraulically actuated (not shown). Alternatively, the vacuum cups 16 and 18 are manually operated by a curved handle (not shown) or the like in a well known manner, and the body portions 12 and 14 have handles (not shown) attached thereto in order to manually move the body portions 12 and 14 relative to one another.

Alternatively, each of the panels 50 and 52 is loosely attached to the respective mounting location 54 or 56, defining the gap 51 between the panels 50 and 52, each of the panels 50 and 52 move when the actuators 20 are activated, and are each fixedly attached to the respective mounting locations 54 and 56 when the respective edges 50a and 52a of each of the panels 50 and 52 is touching the exterior surfaces of the pins 32.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the tools 10 and 10' have been described having the vacuum cups 16 and 18 for attaching to the body panels 50 and 52, those skilled in the art will appreciate that any type of device that may be firmly and releasably attached to a pair of panels, such as the panel 50 and 52 including, but not limited to, a locating pin, a nylon nesting block, a hook, or any type of machined surface which attaches, retains, and keeps the panels 50 and 52 in compression while the panels 50 and 52 are secured. In addition, while the present invention has been illustrated with a pair of tools 10 and 10', those skilled in the art will appreciate that single or multiple variants of the tool 10 can be used, wherein the tools 10 or 10' can be ganged for multiple use.

The invention claimed is:

1. A tool for setting a gap between a pair of panels including a first panel movably attached at a first mounting location and a second panel fixedly attached at a second mounting location, the panels being spaced apart to define a gap between the panels, comprising:
   a first body portion adapted to be releasably attached to the first panel, said first body portion including an elongated aperture formed therein;
   a guide rod extending across a length of said elongated aperture;
   a pair of springs mounted on said guide rod in said elongated aperture;
   a second body portion adapted to be releasably attached to the second panel;
   an actuator having an axis of movement and operatively engaging said first body portion and said second body portion for moving said first body portion relative to said second body portion along said axis of movement; and
   a pin having a predetermined diameter mounted in said elongated slot between said pair of springs, said pair of springs resiliently biasing said pin toward a center portion of said elongated slot, said pin operatively engaging said guide rod such that said pin is slidable in said elongated slot;
   whereby when said first and second body portions are each attached to the respective first and second panels and said pin extends into the gap between the panels, said second body portion is moved relative to the first body portion until the first and second panels contact the pin thereby setting the gap at said predetermined diameter.

2. The tool according to claim 1 wherein said actuator includes a power rod extending along said axis of movement and operatively engaging said first body portion and said second body portion and movable to vary a distance between said first body portion and said second body portion, and a guide rod extending between said first body portion and said second body portion parallel to said power rod and axially slidable relative to one of said first body portion and said second body portion.

3. The tool according to claim 2 including an air source for supplying compressed air to actuate said actuator.

4. The tool according to claim 1 wherein at least one of said body portions has a vacuum cup to releasably attach to a respective body panel.

5. The tool according to claim 4 including a vacuum source for supplying a vacuum to said vacuum cup.

6. The tool according to claim 1 including a control panel for controlling the movement of said body portions and for controlling the attachment of said body portions to the body panels.

* * * * *